3,208,136
METHOD OF JOINING PIPE
Alvin Earl Joslin, 1559 Elite Road, Clarkson,
Ontario, Canada
Filed Aug. 16, 1963, Ser. No. 303,472
6 Claims. (Cl. 29—458)

This is a continuation-in-part application of application Ser. No. 221,259, filed Sept. 4, 1962, now abandoned.

This invention relates to methods of connecting lengths of pipe, and is particularly concerned with a method of forming a pipe joint essentially formed by forcibly ramming the pipe together.

In my earlier application, I disclosed a method of joining pipe which was thought to have particular utility in connecting relatively thin walled aluminum pipe. It has now been found that the method is equally suitable to joining lengths of relatively thick walled pipe and to joining pipe formed of harder metals than aluminum. Thus, the pipe joint in accord with this invention can be used in connecting almost any type of metallic pipe from small diameter thick walled steel pipe to large diameter thin walled aluminum pipe. It is essential only that the pipe material possess a certain amount of malleability as to be capable of deforming as required as the joints are effected. This requirement, of course, does exclude cast iron and asbestos pipe from use with this invention.

One of the major cost items in any piping system is the labour and material costs involved in joining the pipe lengths together. Heretofore, there has been provided several different joining arrangements, most of which are characterized by a clamping ring of one type or another and some type of sealant which may take the form of a rubber gasket. These devices, as well as being expensive to manufacture and install, are not always effective in retaining a tight seal.

The joining method in accord with the invention is extremely simple and avoids most of the drawbacks of the prior joining arrangement. Essentially, this novel method consists of forming a small bell on one pipe end to be joined, rolling an annular groove in the other pipe end to be joined, and telescoping the latter pipe end inside the first with such force as to cause the second pipe end to buckle somewhat in the region of the annular groove, whereby it is forced outwardly against the inside wall of the belled pipe end. As an additional step, the outside surface of the spigot end or the inside surface of the bell end is coated with a liquid sealant prior to the telescoping of the pipe ends. The sealant not only subsequently hardens to insure a good seal, but it also acts as a lubricant at the time the pipe ends are telescoped.

The invention will be more thoroughly understood from the following description of a preferred embodiment thereof as read in conjunction with the accompanying drawings.

Figure 2A:
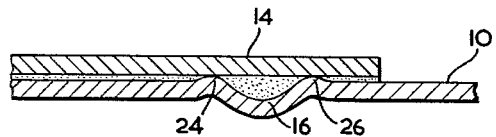
FIGURE 2a is an enlarged view of a portion of FIGURE 2.

The pipe illustrated in the drawings is aluminum pipe such as now commonly used in underground sprinkler systems for golf courses and the like. It is to be understood, however, that the pipe joint in accord with this invention is equally adaptable to any pipe material having a certain amount of malleability.

Figure 1:
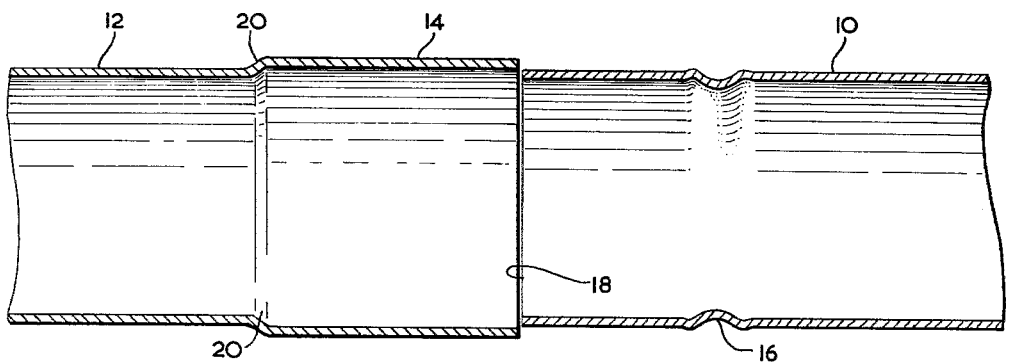
FIGURE 1 is a cross-sectional view taken along the longitudinal axis of two aligned pipe ends.

FIGURE 1 illustrates a male pipe end 10 and a female pipe end 12. In actual fact, however, both these pipe end constructions are derived from straight walled pipe with the bell portion 14 of the female pipe end 12 and the annular groove 16 in the male pipe end 10 being formed in the field at the time the joint is connected. Thus, bell 14 is developed by ramming a forming tool forcibly into a straight pipe end. The inside diameter of the bell is made sufficiently large to take the spigot end with little clearance between them.

Spigot end 10 is provided with an annular groove 16 by means of a simple grooving tool. Again, this forming of the groove 16 can be done in the field at the time the bell portion 14 is formed. Alternatively, both bell 14 and groove 16 can be formed prior to delivery to the field.

Groove 16 must be formed at a distance from the end of pipe end 10 which is less than the axial length of bell portion 14 of pipe end 12. On the other hand, it is preferable that groove 16 not be formed closely adjacent the pipe end 12, since a uniform buckling of the wall of pipe end 12 in the region of groove 16 is best obtained when groove 16 is spaced from the end.

Figures 2, 3:
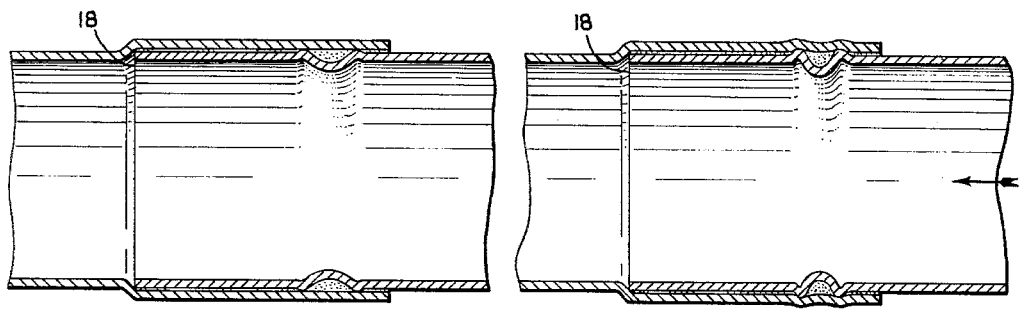
FIGURE 2 is a view similar to FIGURE 1 showing the pipe ends as first telescoped together.
FIGURE 3 is a view similar to FIGURE 2, but showing the final form of the pipe joint resulting from further telescoping of the pipe ends following their arrangement in accord with FIGURE 2.

As a first step in connecting the two pipe ends, they are telescoped together in the manner shown in FIGURE 2. In view of the close spacing between the inside of bell 14 and the outside of spigot end 10, this initial telescoping of the two pipe ends is best achieved by means of a portable hydraulic ram device. Such device can take the form of a pair of annular clamps adapted to tightly engage about both pipe ends, and a hydraulic or pneumatic piston arrangement for forcing the two clamps towards one another. The same apparatus can be readily adapted to accommodate the forming tool referred to above for effecting the bell portion 14 on the pipe end 12. This apparatus can conveniently be mounted on wheels for easy transportation to and from the field, and for movement along the pipe line being laid.

To lend further assistance to the telescoping of the pipe ends, a liquid sealant can be used to coat the inside of bell 14 or the outside of spigot end 10. This sealant thus serves the dual role of acting as a lubricant at the time the joint is formed, and subsequently hardening to fill in minute spaces which might develop between the telescoping ends. A preferred liquid sealant is the epoxy resin known by the trade mark "Nupon A." This is a vinyl epoxy and is combined with an amine catalyst by which it is pigmented, stabilized and cured. This material has the ideal qualities for effecting the lubrication desired as the telescoped ends are connected, and for hardening to an effective sealant.

Following the initial telescoping of the two pipe ends to the stage illustrated in FIGURE 2, the telescoping force is stepped up so that the spigot end 10 buckles in the region of groove 16 as illustrated in FIGURE 3. It will be understood, of course, that in order to achieve this buckling, it is essential that the forward end 18 of spigot end 10 abut against the shoulder 20 of bell 14.

Figure 3A:
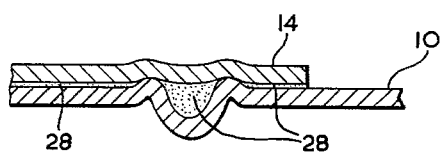
FIGURE 3a is an enlarged detailed view of a portion of FIGURE 3.

Referring now to FIGURE 2a, it will be noticed that the formation of groove 16 in the spigot end 10 also causes very slight annular ridges 24 and 26 to be pushed up on either side of groove 16. In effect, therefore, the actual seal between the spigot end 10 and bell 14 is achieved about the outside surfaces of these ridges 24 and 26. As can be seen in FIGURE 3a, these ridges 24 and 26 are increased in size by the stress set up on the wall of the spigot end 10 as the latter is forcibly rammed against shoulder 20 of bell 14. The sealant 28 fills both the minute spaces as might occur between the spigot end 10 and bell 14, as well as the larger annular space of groove 16, whereby to insure no leakage will occur. It will also be noted that the wall of bell 14 is slightly forced outwardly in the region of the two ridges 24 and 26. Accordingly, the combination of ridges 24 and 26 within these annular ridges in bell 14 serves as an effective lock against withdrawal of pipe end 10 from bell 14.

The joint in accord with this invention is extremely simple and inexpensive compared with the joining methods heretofore available. The only material required other than the pipe wall material itself is the sealant. Beyond this, the only equipment required to effect the joints is the hydraulic or pneumatic apparatus for forcibly telescoping the pipe ends together. This apparatus does not have to be built to particularly close tolerances and is not an expensive piece of apparatus.

The foregoing example of the invention describes a pipe joint connecting lengths of aluminum pipe. However, as previously mentioned, the invention is equally adaptable to other types of pipe manufactured of material having a certain amount of malleability. Thus, the invention may be used for everything from small diameter copper tubing to large diameter steel pipe such as may be used in oil pipe lines.

Regardless of the type of pipe concerned, the joint is effected in the same manner in each case, i.e., a bell is formed on one pipe end, a groove is rolled in the other pipe end and the two are forcibly telescoped together as to buckle the spigot end in the manner previously described. In this regard, it is to be further noted that, as the wall of the spigot end is forced radially outwardly in the region of the groove, the bell end is also somewhat radially expanded. This expansion of the bell takes place only in the region of the groove on the spigot end. As a result that portion of the bell which extends from the groove to the mouth of the bell is somewhat tapered. This taper effectively locks the spigot end against withdrawal from the bell. Further, it can be seen that high internal pressures tending to move the spigot from the bell will force the expanded spigot against this taper as to increase the sealing effect between them.

It has been found that while an effective pressure tight seal can be obtained without a sealant, consistent results in this regard do require a sealant. It is believed that if the pipe lengths joined were provided with mirror smooth surfaces, a perfect seal would be obtained every time without a sealant. In practice, however, commercial grade pipe material is not manufactured to such a degree of perfection and the minute surface scratches and pit holes which are formed at the time the pipe is made, or during formation of the joints, must be filled in to obtain a pressure type seal in every joint.

A second preferred sealant is epoxy polyamide resin, commonly referred to as patching putty, and sold under the trade mark "Nupon Type 2." This material contains no volatiles and will set out of contact with air and does not shrink on curing.

To demonstrate the effectiveness of the joint in accord with the invention, representative aluminum and steel pipe joints were formed and subjected to both hydrostatic and tensile tests. In all cases, the tested samples resisted the stresses set up to the capacity of the testing equipment or failed at points other than the joints themselves. Thus, in the case of 2, 3, 4, 5 and 6 inch aluminum pipe, the samples failed by expansion or splitting of the outer ends of the pipe lengths at internal hydrostatic pressures of 1100, 850, 825, 675 and 625 p.s.i. respectively. As stated, failure of the test samples occurred by expansion or splitting of the pipe at the outer ends of the pipe lengths, i.e., at the ends remote from the joints themselves. In all cases, the joints proved stronger than the walls of the pipe and no movement in the joints was noted.

In the case of steel pipe, sample joints were made up from ¾, 1, 1¼, and 2 inch pipe and hydrostatically tested to a p.s.i. load of 7500, this being the capacity of the testing equipment. In no case was there any failure of the pipe or movement of the joint.

Tensile tests were also carried out to determine the force required to pull the joints apart. With 2 inch steel pipe, a force of 31,700 pounds was required. A series of tests were made on aluminum pipe from 2 to 6 inches in diameter. In all cases, the joints withstood the force tending to pull them apart up to the capacity of the testing equipment at 94,200 pounds. No movement in any joint was noted.

As previously stated, the joint in accord with the invention is "self-locking," due to the manner in which the bell end is expanded in the region of groove on the spigot end whereby to gain a reverse taper in the bell. To illustrate this taper, measurements were taken along one side of the bell of a joint made up from 3" aluminum pipe. The measurements were made by means of a surface plate and a fixed dial indicator graduated in .001". The joint was passed under the gauge with the following results.

|  | Inch |
|---|---|
| At mouth of bell | .033 |
| Between mouth and groove area | .033 |
| Immediately prior to groove area | .036 |
| At groove area | .044 |
| After groove area | .035 |
| At end of bell area | .037 |

What I claim as my invention is:

1. Method of joining a first pipe and a second pipe, said pipes being made from substantially permanently deformable material, comprising, forming an annular groove in an end portion of said first pipe, said annular groove extending substantially radially inwardly of said first pipe whereby the sides of said groove will expand under axial compression, forming a bell on an end of said second pipe including an annular shoulder connecting said bell and the remainder of said second pipe, inserting said end portion including said groove into said bell to abut said end portion against said shoulder, telescopically forcing said first pipe and said second pipe together, buckling the wall of said first pipe at said groove to expand the wall of said end portion outwardly along the sides of said groove against the interior wall of said bell and produce at least one annular deformation in the wall of said second pipe adjacent to said groove.

2. Method as claimed in claim 1 wherein the outer surface of said end portion of said first pipe is coated with a sealant.

3. A method of joining a first pipe and a second pipe, said pipes being made from substantially permanently deformable material, wherein an end portion of said second pipe is formed on its inner wall with an outwardly facing lateral shoulder, and an end portion of said first pipe is formed with an annular groove extending substantially radially inwardly of said first pipe whereby the sides of said groove will expand under axial compression, comprising the steps of disposing said end portion of said first pipe including said annular groove within said end portion of said second pipe including said shoulder to abut the end of said first pipe against said shoulder, and axially forcing said first pipe and said second pipe together while maintaining the end of said first pipe disposed within said second pipe substantially stationary relative to said second pipe by abutment with said shoulder, to cause buckling of the wall of said first pipe at said groove to expand said first pipe along the sides of said groove against the interior wall of said second pipe and thereby produce at least one annular deformation in said second pipe wall adjacent said groove.

4. Method as claimed in claim 1 wherein said first and second pipes are made of aluminum.

5. Method as claimed in claim 1 wherein said first and second pipes are made of copper.

6. Method as claimed in claim 1 wherein said first and second pipes are made of steel.

References Cited by the Examiner
UNITED STATES PATENTS

| | | | |
|---|---|---|---|
| 1,113,574 | 10/14 | O'Brien. | |
| 1,120,731 | 12/14 | McIlroy | 29—458 |
| 1,802,538 | 4/31 | Rych | 29—523 XR |
| 2,120,067 | 6/38 | Gray et al. | 285—382.7 X |
| 2,398,788 | 4/46 | Hedrick | 285—284 |
| 2,458,722 | 1/49 | Nusset et al. | 285—284 |
| 2,614,827 | 10/52 | Peach et al. | 285—382.5 X |
| 2,816,211 | 12/57 | Hutchins | 285—382.2 |
| 2,949,319 | 8/60 | Hutchins | 285—382.5 X |
| 3,068,563 | 12/62 | Reverman | 29—458 |

WHITMORE A. WILTZ, *Primary Examiner.*

CARL W. TOMLIN, *Examiner.*